(12) United States Patent
Iwazaki et al.

(10) Patent No.: US 7,233,851 B2
(45) Date of Patent: Jun. 19, 2007

(54) DRIVING ASSIST APPARATUS AND METHOD FOR VEHICLE

(75) Inventors: Katsuhiko Iwazaki, Suntou-gun (JP); Hisashi Satonaka, Susono (JP); Yuichi Kubota, Okazaki (JP); Tomohiko Endo, Toyota (JP); Akira Matsui, Toyota (JP); Hideyuki Iwakiri, Tajimi (JP); Toru Sugiyama, Toyota (JP); Seiji Kawakami, Susono (JP); Hiroaki Kataoka, Susono (JP); Yuu Tanaka, Aichi-gun (JP); Yoshifumi Iwata, Anjo (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 541 days.

(21) Appl. No.: 10/870,919

(22) Filed: Jun. 21, 2004

(65) Prior Publication Data
US 2004/0267423 A1 Dec. 30, 2004

(30) Foreign Application Priority Data
Jun. 26, 2003 (JP) ............................. 2003-183114

(51) Int. Cl.
*G06F 19/00* (2006.01)
(52) U.S. Cl. ............................. 701/41; 701/42; 701/23
(58) Field of Classification Search ................. 701/23, 701/25, 41, 42; 340/932.2, 438, 441; 342/71
See application file for complete search history.

(56) References Cited

U.S. PATENT DOCUMENTS

| 4,931,930 A | 6/1990 | Shyu et al. |
| 6,070,684 A | 6/2000 | Shimizu et al. |
| 6,074,020 A * | 6/2000 | Takahashi et al. .......... 303/146 |
| 6,826,469 B2 | 11/2004 | Iwata et al. |
| 2001/0026317 A1 | 10/2001 | Kakinami |

FOREIGN PATENT DOCUMENTS

| DE | 199 40 007 A1 | 3/2001 |
| EP | 1 123 844 A1 | 8/2001 |
| JP | A-5-297935 | 11/1993 |
| JP | A 2001-1929 | 1/2001 |
| WO | WO 2004/050458 A1 | 6/2004 |

OTHER PUBLICATIONS

U.S. Appl. No. 10/871,013, filed Jun. 21, 2004, Iwazaki et al.
U.S. Appl. No. 10/871,010, filed Jun. 21, 2004, Iwazaki et al.
U.S. Appl. No. 10/871,032, filed Jun. 21, 2004, Iwazaki et al.

* cited by examiner

*Primary Examiner*—Richard M. Camby
(74) *Attorney, Agent, or Firm*—Oliff & Berridge, PLC (57) ABSTRACT

A vehicle driving assist apparatus for guiding a vehicle to a target position is provided. A basic path that changes the deflection angle θ to 0 is determined, and is subjected to similarity transformation. On the basis of the similarity-transformed path, a path factoring in transition from the initial steering angle is set. Then, a correction is made such that the area in the running distance-curvature graph regarding this path becomes equal to a corresponding area regarding the basic path, thereby setting a corrected path. The corrected path is similarity-transformed, and then is re-corrected in accordance with transition from the initial steering angle. Thus, a final target path is obtained.

7 Claims, 9 Drawing Sheets

DRIVING ASSIST APPARATUS AND METHOD FOR VEHICLE

INCORPORATION BY REFERENCE

The disclosure of Japanese Patent Application No. 2003-183114 filed on Jun. 26, 2003, including the specification, drawings and abstract is incorporated herein by reference in its entirety.

BACKGROUND OF THE INVENTION

1. Field of the Invention

The invention relates to vehicular driving assist apparatus and method for determining a locus of run to a target position and assisting the driving of a vehicle so that the vehicle follows the locus of run.

2. Description of the Related Art

A related-art technology for guiding a vehicle to a target position through the use of the automatic steering, the steering command, etc., is disclosed in, for example, Japanese Patent Application Laid-Open Publication No. 5-297935. In this related technology, errors in position, azimuth angle and curvature are measured, and a predetermined locus of run (track pattern) in which the distance of run and the curvature are associated with each other is subjected to similarity transformation so as to determine an actual control locus, as a technique for compensating for the errors.

This technology reduces the track pattern by similarity transformation, so that the vehicle can be promptly returned to the locus from a deviation therefrom if any. As an application of this technology, the track pattern may also be enlarged by similarity transformation, so that it becomes possible to set a guide path that provides a good margin for steering.

However, in the above-described technology based on similarity transformation, if the initial steering state has been set at a position other than a neutral position, the actual curvature and the curvature of a set path disagree. Therefore, since there is an initial-stage difference between the curvature of a set guide path and the actual curvature, the target direction of vehicle run cannot bring the vehicle to the target position. Furthermore, there is a case where the curvature does not become neutral even if the steering wheel is at a neutral position. Still further, if the initial steering state is limited to the neutral position, the operability of the assist operation remarkably degrades.

SUMMARY OF THE INVENTION

As forms of the invention, driving assist apparatus and method for a vehicle described below are provided. The driving assist apparatus includes: a setting portion that sets a basic path that changes a direction of the vehicle at an initial position so as to coincide with a direction of the vehicle at a target position based on a deflection angle that is an angle formed between the direction of the vehicle at the initial position and the direction of the vehicle at the target position, and an initial actual steering angle that is an actual steering angle of the vehicle at the initial position; a transforming portion that computes a path obtained by similarity-transforming the basic path based on a relationship between the initial position and the target position; and a correcting portion that corrects the similarity-transformed path into a target path along which the vehicle reaches the target position based on a difference between the initial actual steering angle and a steering angle occurring at an initial position on the similarity-transformed path.

The driving assist method includes the steps of: setting a basic path that changes a direction of the vehicle at an initial position so as to coincide with a direction of the vehicle at a target position based on a deflection angle that is an angle formed between the direction of the vehicle at the initial position and the direction of the vehicle at the target position, and an initial actual steering angle that is an actual steering angle of the vehicle at the initial position; computing a path obtained by similarity-transforming the basic path based on a relationship between the initial position and the target position; and correcting the similarity-transformed path into a target path along which the vehicle reaches the target position based on a difference between the initial actual steering angle and a steering angle occurring at an initial position on the similarity-transformed path.

According to the above-described driving assist apparatus and method, the direction of the vehicle at the present position is changed so as to coincide with the direction of the vehicle at a target position. Specifically, a basic path, that is, a path that changes the deflection angle to 0, is determined, and then is subjected to similarity transformation, thereby determining a similarity-transformed path. Therefore, the apparatus and method can set a path that provides a good margin in terms of the curvature of turn of the vehicle. The similarity transformation alone may allow deviation in the direction and position of the vehicle at a final position on the path if the initial state of the vehicle is a steered state. Therefore, such deviation is corrected on the basis of a difference between the steering angle on the similarity-transformed path and the initial actual steering angle. In this manner, errors in position and direction at the final position on the path are substantially cancelled out, so that the vehicle can be accurately guided to a region at or adjacent to the target position.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

In the following description, the present invention will be described in more detail in terms of exemplary embodiments.

Figure 1:
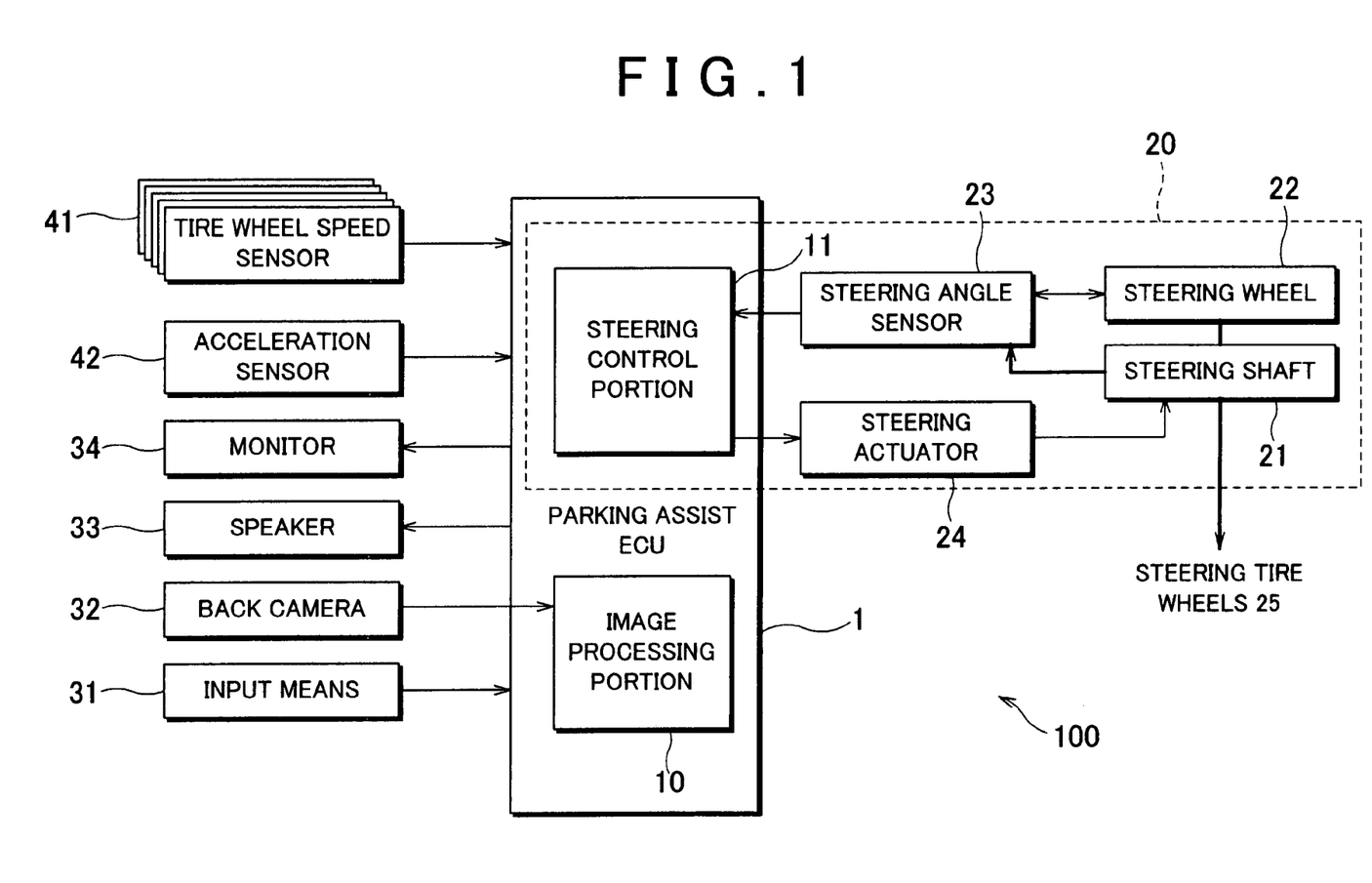
FIG. 1 is a block diagram illustrating the construction of a parking assist apparatus in accordance with an embodiment of the invention.

A driving assist apparatus in accordance with the invention will be described with reference to a parking assist apparatus as an example. FIG. 1 is a block diagram illustrating the construction of a parking assist apparatus 100 in accordance with an embodiment of the invention. The parking assist apparatus 100 has an automatic steering device 20, and is controlled by a parking assist ECU 1 that is a control device. The parking assist ECU 1 is formed by a CPU, a ROM, a RAM, an input signal circuit, an output signal circuit, a power supply circuit, etc. Furthermore, the parking assist ECU 1 has an image processing portion 10 that processes images acquired via a back camera 32 described below, and a steering control portion 11 that controls an automatic steering device. The image processing portion 10 and the steering control portion 11 may be separate from each other in terms of hardware within the parking assist ECU 1, or may be separate in terms of software while sharing the CPU, the ROM, the RAM, etc. that are provided in the parking assist ECU 1.

A steering angle sensor 23 for detecting the amount of steer of a steering shaft 21 that transfers the movement of a steering wheel 22 to steering tire wheels 25, and a steering actuator 24 that provides steering force are connected to the steering shaft 21. In addition to providing a steering force during an automatic steering mode, the steering actuator 24 may serve as a power steering device that provides an assist steering force while a driver is steering. The steering control portion 11 controls the driving of the steering actuator 24.

The steering control portion 11 receives an output signal of the steering angle sensor 23, and also receives output signals of tire wheel speed sensors 41 that are provided for the individual tire wheels for detecting the rotation speeds thereof and an output signal of an acceleration sensor 42 that detects the acceleration of the vehicle.

The aforementioned image processing portion 10 receives an image signal, that is, an output signal of the back camera 32 disposed at a rear portion of the vehicle for acquiring mages in a rearward direction. The image processing portion 10 is connected to input means 31 for accepting a driver's input operation in conjunction with the parking assist, a monitor 34 for displaying information in the form of images to a driver, and a speaker 33 for presenting information in the form of sounds and voices.

Figure 2:
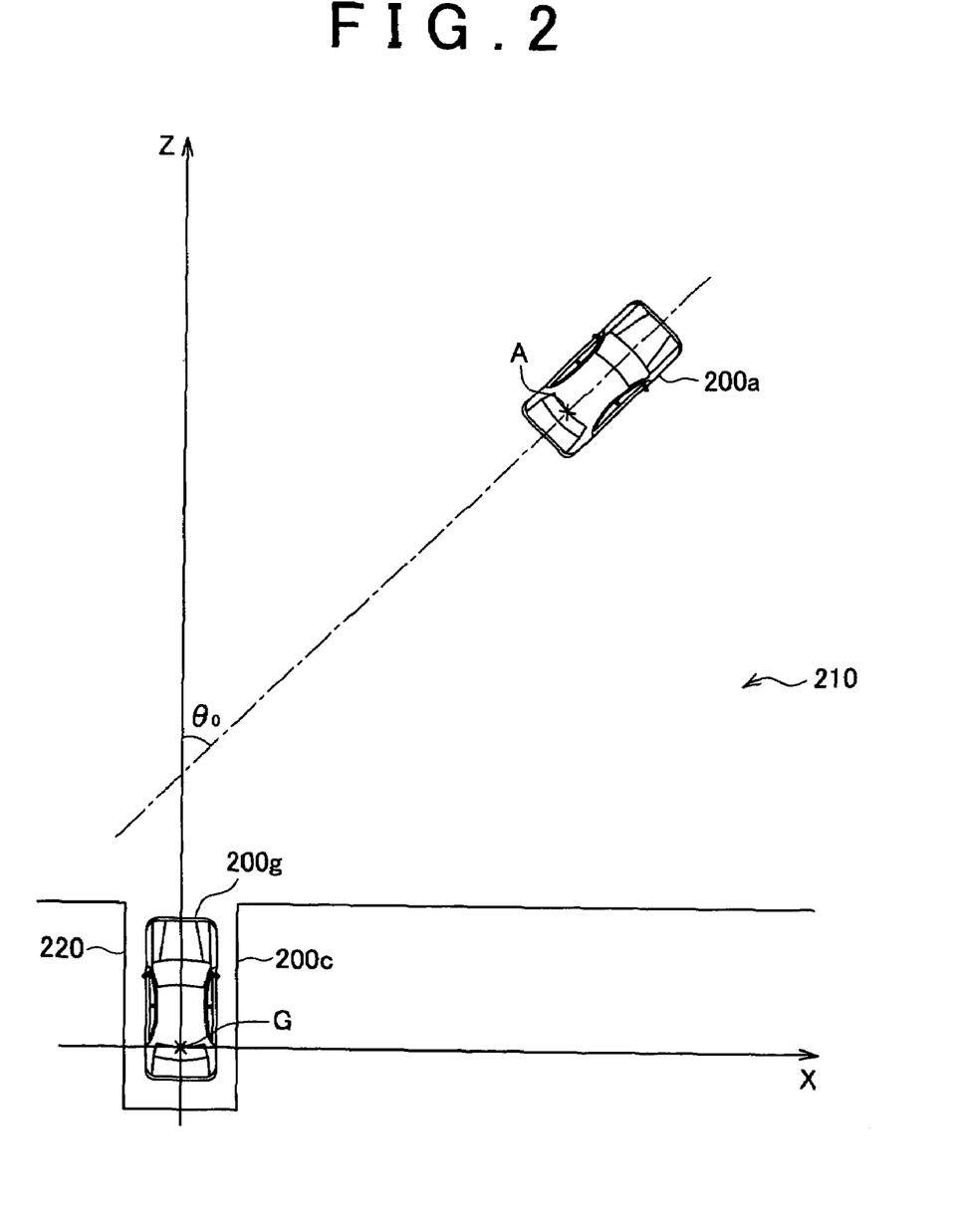
FIG. 2 is a diagram illustrating a positional relationship of a vehicle during a garage parking assist operation performed by the apparatus illustrated shown in FIG. 1.
Figure 3:
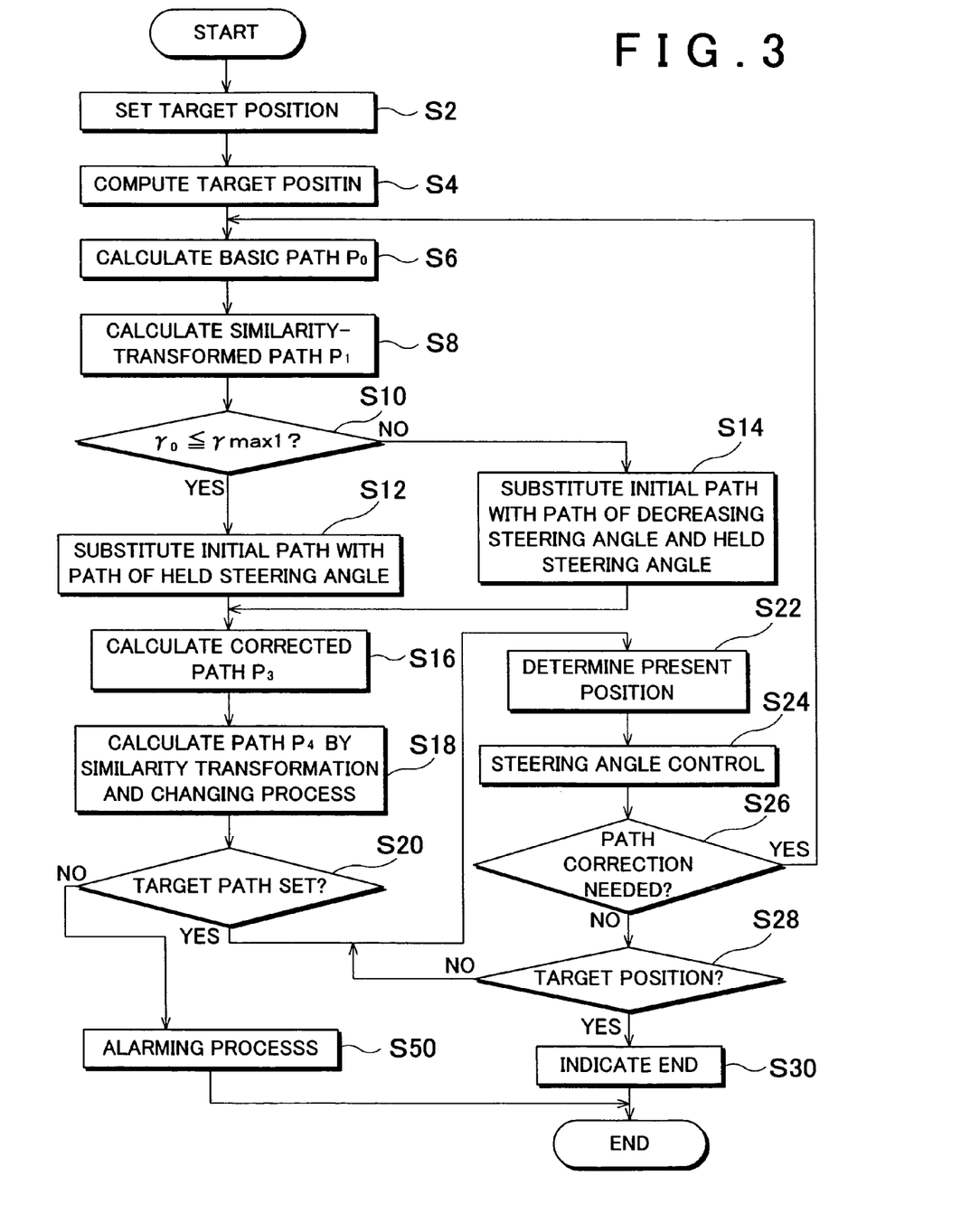
FIG. 3 is a flowchart illustrating the assist operation indicated in FIG. 2.
Figure 6:
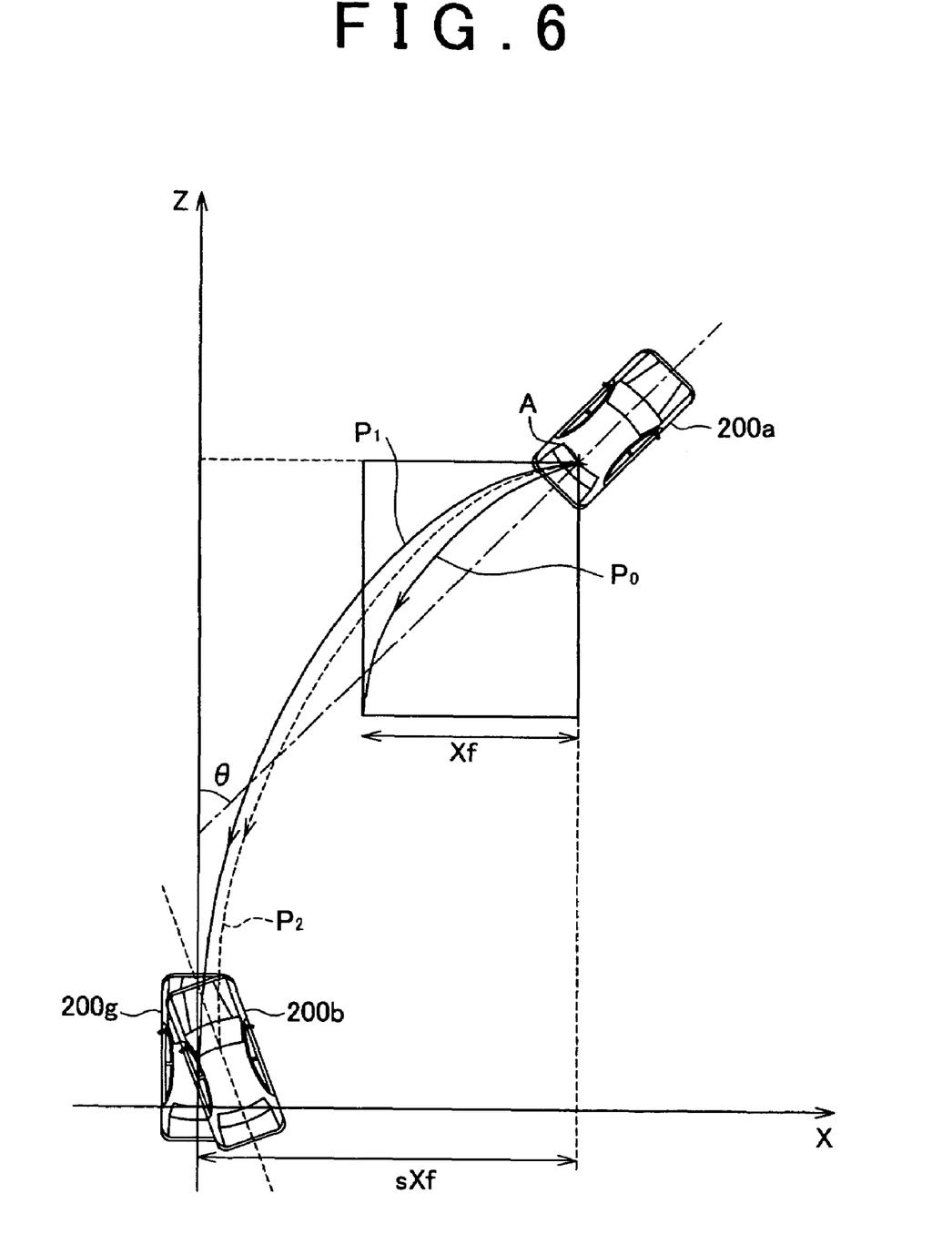
FIG. 6 is a diagram illustrating the deviation from the target position on a similarity-transformed path.
Figure 7:
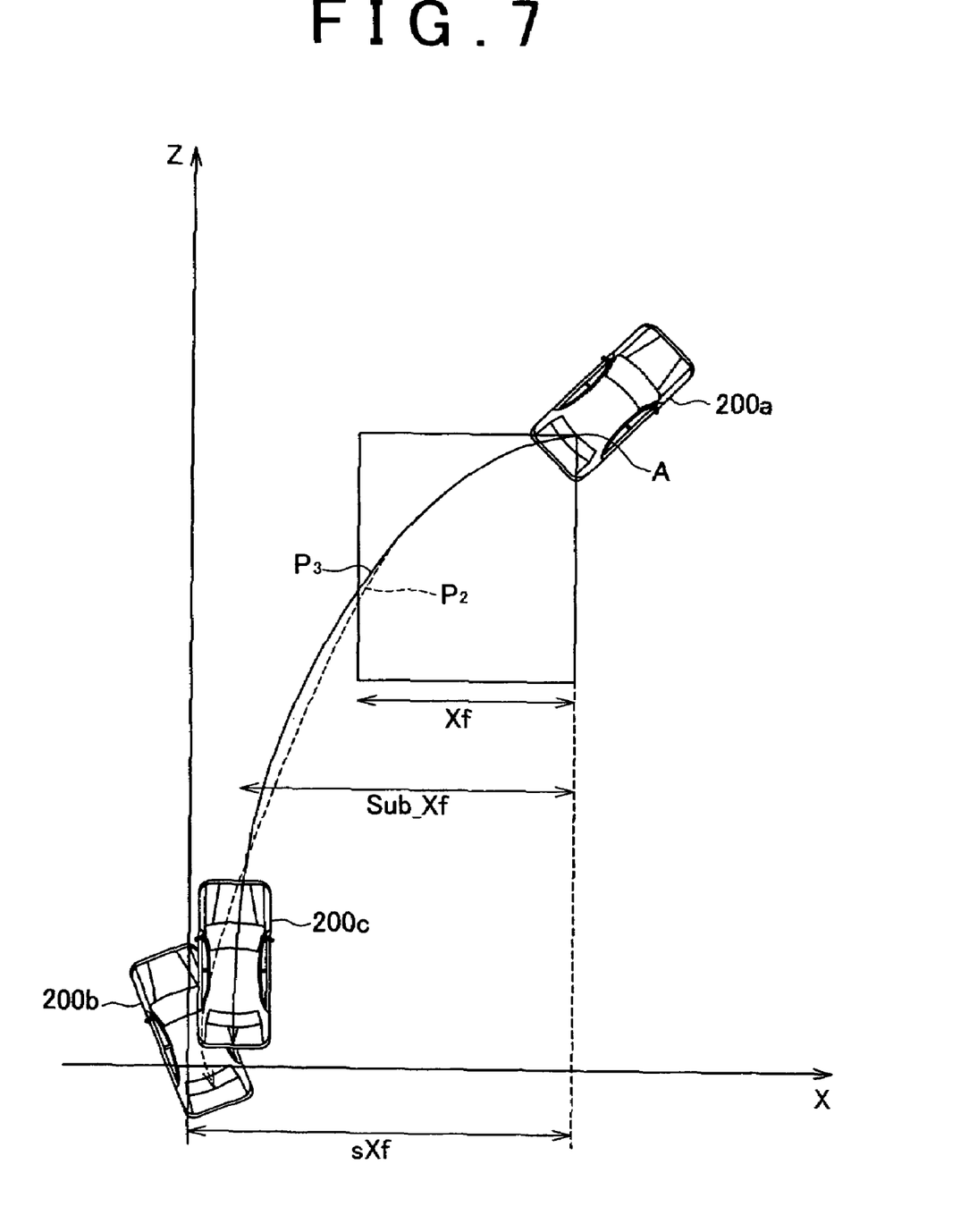
FIG. 7 is a diagram illustrating a state that occurs after correction of deflection angle.
Figure 8:
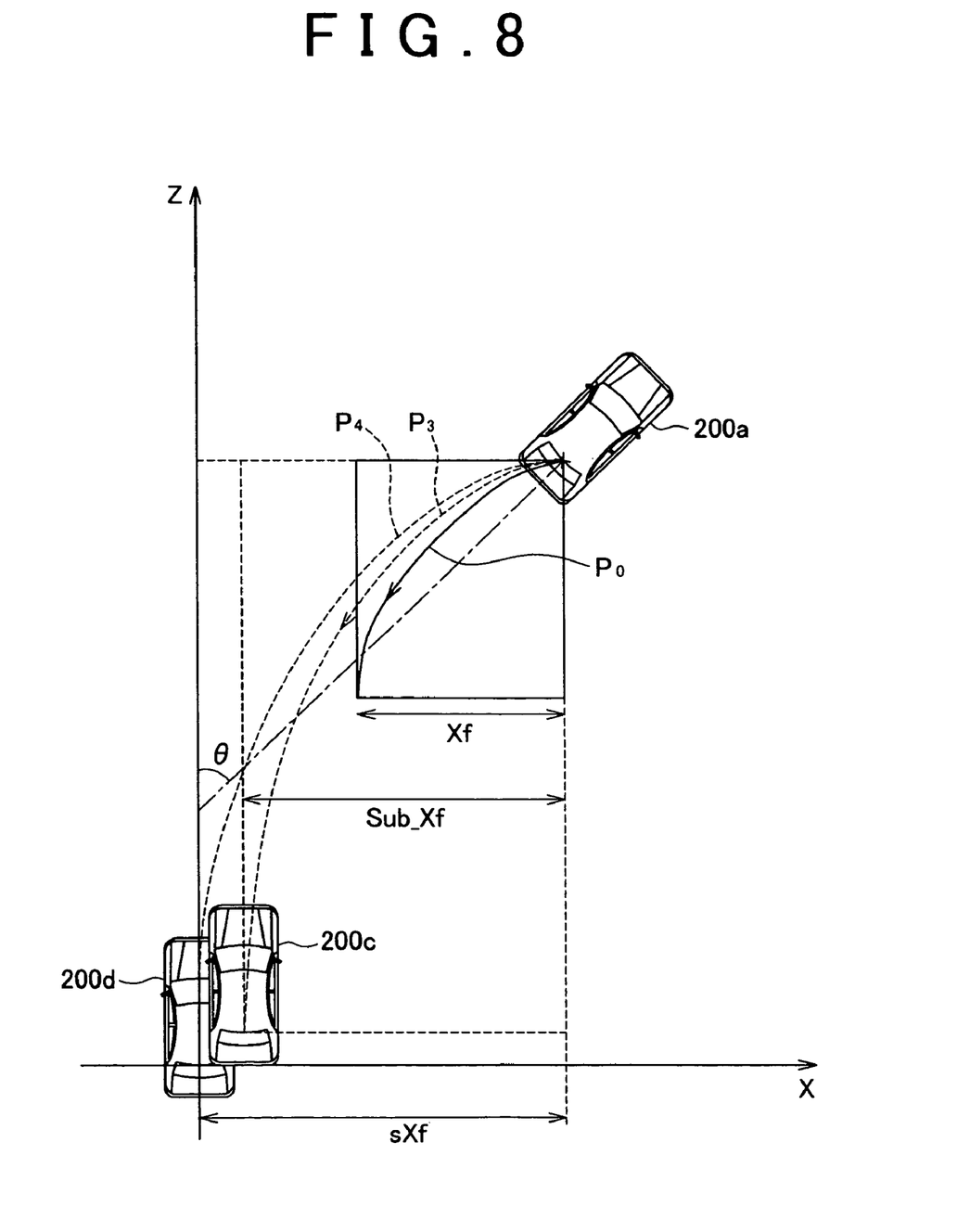
FIG. 8 is a diagram illustrating a state that occurs after correction of position.
Figure 9:
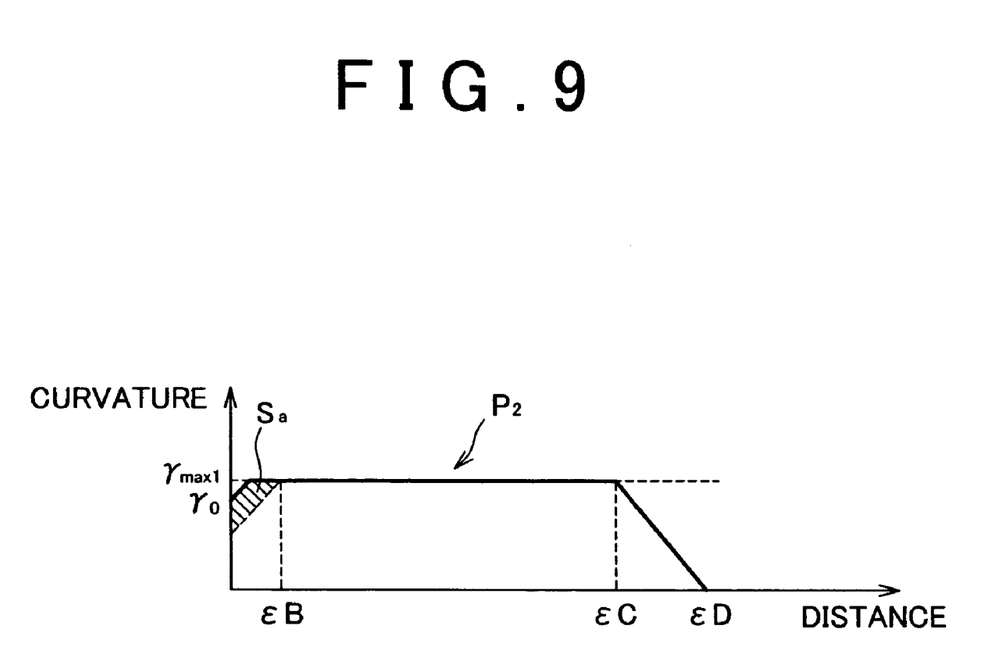
FIG. 9 is a diagram illustrating another method for setting a set running locus in the control illustrated in FIG. 3.

Next, assist operations of the parking assist apparatus will be specifically described. Below described will be an assist operation performed in a case of "garage parking" as illustrated in FIG. 2 where a vehicle 200 is backed into a garage 220 that faces a road 210. FIG. 3 is a flowchart of a control of this assist operation. FIGS. 4A to 4E and FIGS. 5A and 5B are diagrams illustrating the setting of a set locus of run in the control. FIGS. 6 to 8 are diagrams illustrating movements of the vehicle 200 based on different set loci of run.

The control illustrated in FIG. 3 is started after the output of a command for the parking assist ECU 1 to start the parking assist following a driver's operation of the input means 31, and continues to be executed by the parking assist ECU 1 until: i) the vehicle reaches the vicinity of a specified target parking position, or ii) it is determined that the vehicle cannot reach the target parking position by a single backing run. This control continues unless the assist operation is cancelled by a driver using the input means 31.

Specifically, the driver commands the start of the parking assist operation via the input means 31 after moving the vehicle 200 in such a fashion that a reference point of the vehicle 200 coincides with a point A indicated in FIG. 2. In the description below, it is assumed that the reference point is a center of the axle of the rear wheels of the vehicle. The reference point may be various other positions, for example, a center of a rear end of the vehicle, the center of gravity thereof, a front end of a side portion, a rear end of a side portion, etc. The vehicle being at a position to start the parking assist operation is indicated by 200a.

The driver operates the input means 31 while watching an image that is taken by the back camera 32 and displayed on the monitor 34. At this time, the driver moves a parking frame displayed in the screen to a target parking position, thereby setting a target parking position (step S2).

The parking assist ECU 1 determines a vehicle position 200g assumed when the vehicle reaches the target parking position, that is, the position of a reference point G and the direction of the vehicle at that position (step S4).

The position of the point G may be determined, for example, as a relative coordinate with respect to the reference point A of the vehicle at the present vehicle position. The below description will be made with reference to a coordinate system as shown in FIG. 2 where the target position G is defined at the origin, and the orientation of the vehicle at the target position is defined as the direction of the Z axis, and the direction perpendicular thereto is defined as the direction of the X axis. Hereinafter, the angle of the present orientation of the vehicle with respect to the Z axis will be termed deflection angle $\theta$.

Next, a shortest path (hereinafter, referred to as "basic path") $P_0$ that is needed to reduce the deflection angle $\theta$ to zero is computed from the present position (initial position point A), the present deflection angle $\theta_0$ and the present steering angle $\delta_0$ (step S6).

Figures 4A, 4B, 4C, 4D, 4E:
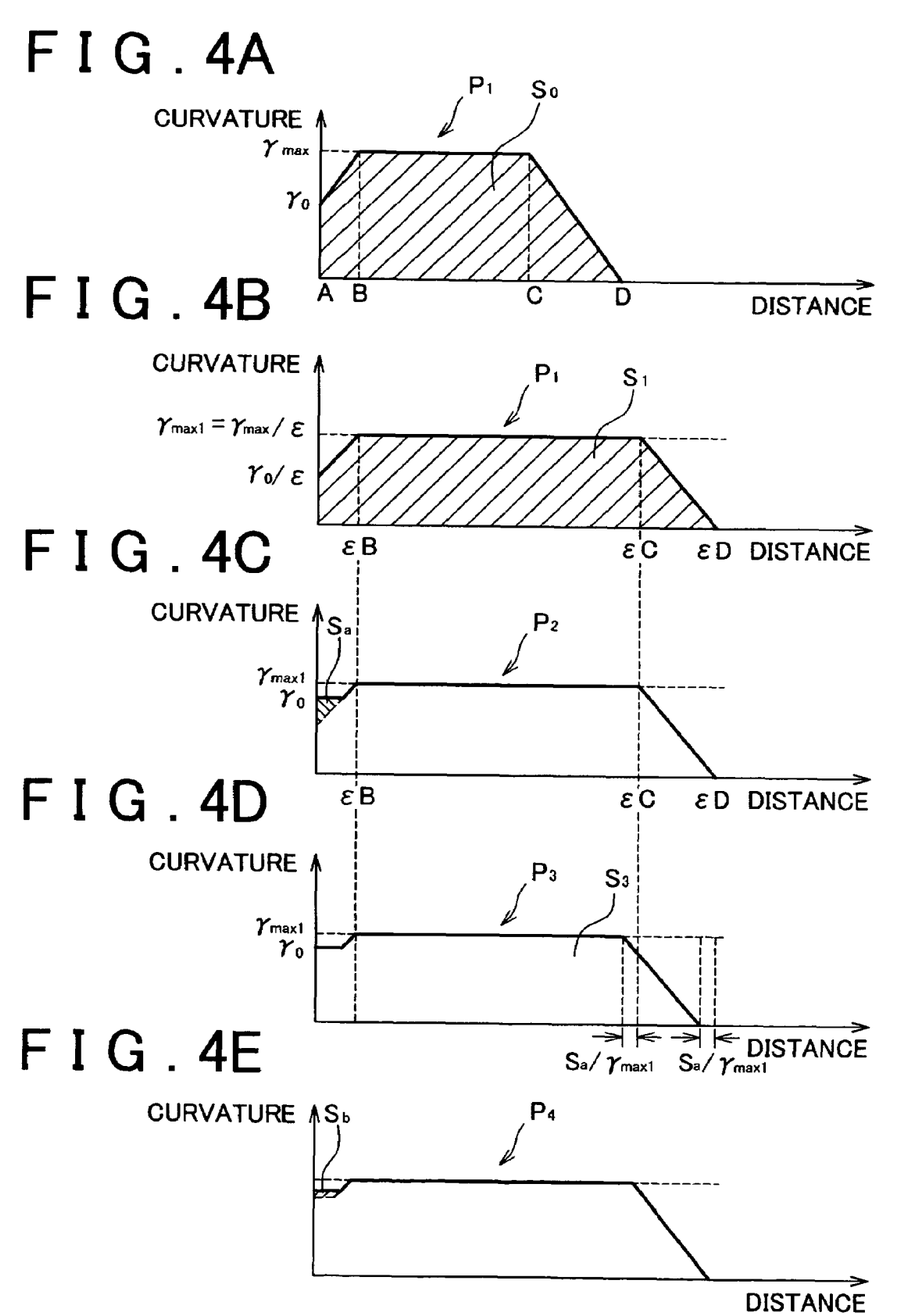
FIGS. 4A to 4E are diagrams illustrating set running loci (paths) based on the control illustrated in FIG. 3.

This running locus $P_0$ is set as changes in the curvature of turn (the reciprocal of the radius of turn) with respect to the distance of run. FIG. 4A shows a running distance-turning curvature graph of the shortest path $P_0$. The locus followed by the vehicle on the basis of the shortest path $P_0$ is indicated by a solid line in FIG. 6.

The shortest path $P_0$ includes a path where the steering angle is increased (First path), a path where the increased steering angle is maintained (Second path), and a path where the steering angle is returned to neutral (Third path). In each one of the first path and the third path, the amount of change in the turning curvature with respect to the running distance (the rate of change in the turning curvature) is set at a constant value. The rate of change in the turning curvature is set so that even when the vehicle speed is equal to an upper limit value for the driving assist, the amount of change in the turning curvature is less than the amount of change in the curvature achieved by the maximum steering rate of the steering actuator 24. Therefore, a path that allows a steering operation without fail can be computed.

Representative examples of the locus set in this case are as follows. Firstly, the steering angle is increased while the rate of change in the steering angle with respect to the running distance from the point A to a point B is kept at a fixed value. In this case, when the point B is reached, the steering angle and the turning curvature become equal to their respective set maximum values, and the turning radius becomes equal to a set minimum turning radius (Rmin) (curvature $\gamma max = 1/Rmin$) (First path). From the point B to a point C, this steering angle (turning curvature, turning radius) is maintained (Second path). From the point C, the steering angle is reduced while the rate of change in the steering angle with respect to the running distance is kept constant. In this case, the steering angle changes to a neutral state, that is, a steering angle of 0, when a point D is reached (Third path). The running locus P forms a clothoid curve where a section BC is an arc having a radius of Rmin, and a section AB is a curve having a curvature of $\gamma_0$ at an end and a curvature of 1/Rmin at the other end, and a section CD is a curve having a curvature of 1/Rmin at an end and a curvature of 0 at the other end.

In some cases where the deflection angle θ is small, the running locus has one or two of the three paths. The amount of change Δθ in the deflection angle θ is expressed as Δθ=∫δdp. That is, the amount of change Δθ in the deflection angle equals an area $S_0$ indicated in FIG. 4A.

Next, a similarity-transformed path $P_1$ obtained by the similarity transformation of the basic path is determined (step S8).

A method of determining the similarity-transformed path $P_1$ will be described with reference to FIGS. 4A to 4E and FIG. 6. The width Xf of the basic path $P_0$ in the direction of the X axis in FIG. 6 is expressed as in Xf=∫ sin θdp. Here, the distance from the initial position A to the target position G in the direction of the X axis is defined as sXf, and ε=sXf/Xf is set. Furthermore, the steering angle δ at a position of distance p from the point A on the basic path $P_0$ is defined as δ=f(p). Hence, the steering angle δ' at the position of distance p from the point A on the similarity-transformed path $P_1$ is expressed as δ'=1/ε×f(p/ε). As indicated in FIG. 4B, the similarity-transformed path $P_1$ is obtained by enlarging a distance of the basic path $P_0$ to a ratio of ε and compressing a curvature of the basic path $P_0$ to a ratio of 1/ε. Therefore, the area $S_1$ regarding the similarity-transformed path $P_1$ is equal to the area δ regarding the basic path $P_0$.

This similarity transformation reduces the maximum value of curvature from γmax of the basic path to 1/ε time γmax, that is, γmax/ε. Therefore, the steering rate reduces, and the controllability of the steering control improves. Furthermore, through the similarity transformation, the initial curvature of the vehicle reduces from an original curvature $\gamma_0$ (corresponding to the steering angle $\delta_0$) to $\gamma_0/\epsilon$. However, the initial steering angle is $\delta_0$ instead of $\delta_1$ corresponding to the aforementioned curvature $\gamma_0/\epsilon$. Therefore, the steering angle needs to be changed to $\delta_0$, which occurs prior to the similarity transformation, (the initial curvature needs to be changed to $\gamma_0$). If such changing is not performed, there occurs a deviation between the vehicle direction at a final position and the vehicle direction at a target position. That is, a deflection angle occurs at a final position.

Therefore, the deflection angle is subsequently corrected. Firstly, the curvature $\gamma_0$ corresponding to the initial steering angle $\delta_0$ and the maximum curvature γmax1 (γmax/ε) after the set similarity transformation are compared with each other (step S10).

If γmax1 is greater than or equal to $\gamma_0$, the initial region where the curvature is less than or equal to $\gamma_0$ is substituted with a region where the steering angle is maintained with the curvature being $\gamma_0$, during the first path of the similarity-transformed path $P_1$ (step S12). Specifically, as indicated in FIG. 4C, a beginning portion of the first path (if γmax1 is equal to $\gamma_0$, the entire portion of the first path) is substituted with a region where the steering angle is kept at the initial steering angle value.

Figure 5A:
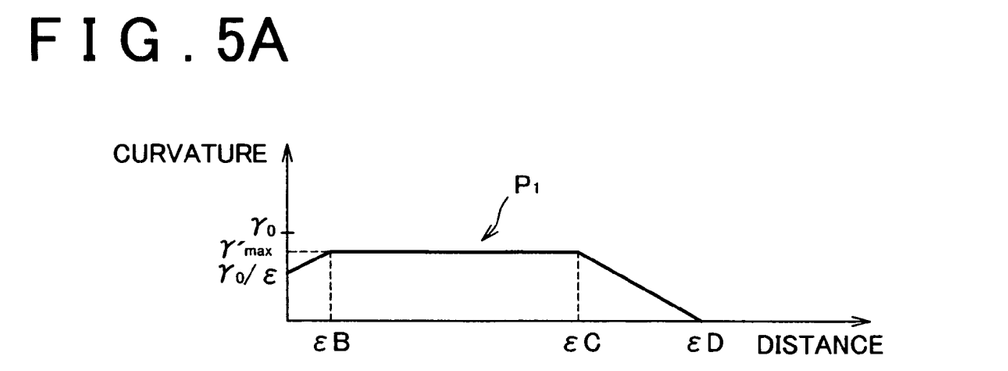
FIGS. 5A and 5B are diagrams illustrating set running loci (paths) factoring in transitions from the initial steering angle.
Figure 5B:
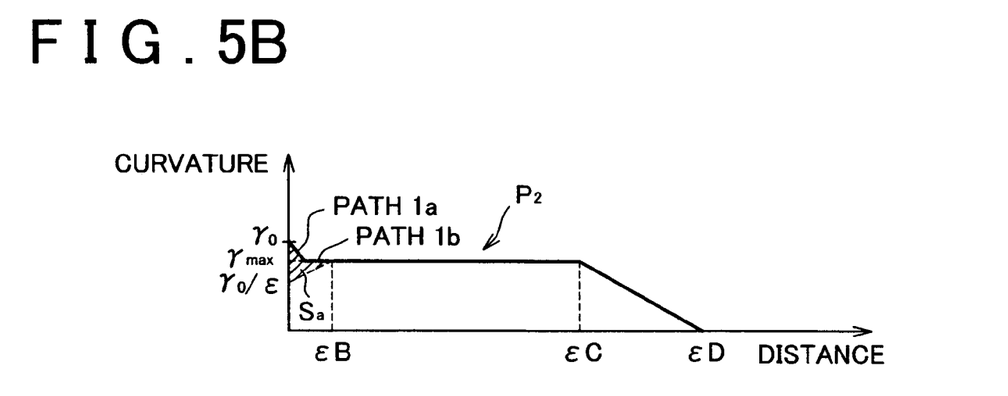

If γmax1 is less than $\gamma_0$ (see FIG. 5A), the first path of the similarity-transformed path $P_1$ is substituted with a path (PATH 1a) where the curvature is reduced from $\gamma_0$ to γmax1 at a rate equal to the curvature change rate of the third path, and a path (PATH 1b) where the curvature is kept at γmax1 (step S14, see FIG. 5B).

Due to the processing of step S12 or S14, the curvature is smoothly changed from the initial curvature $\gamma_0$ to the curvature of the similarity-transformed path $P_1$, so that a path $P_2$ along the similarity-transformed path $P_1$ is set. The setting of the changing path of the curvature in the similarity-transformed path $P_1$ from the initial curvature $\gamma_0$ is not limited to above-disclosed examples. For example, the curvature may be reduced at a constant rate for quick change and transited to the curvature of the similarity-transformed path $P_1$.

On the set path $P_2$, the disagreement between the initial steering angle and the set path is resolved. However, in this case, the following problem occurs. The area in the running distance-turning curvature graph regarding the set path $P_2$ becomes larger than the area regarding the similarity-transformed path $P_1$ by the amount of a region Sa indicated by hatching in FIGS. 4C and 5B. Therefore, the amount of change in deflection angle in the entire path becomes greater than that in the basic path. This results in a deviation as illustrated in FIG. 6. That is, the orientation of the vehicle 200b when the vehicle actually reaches a target location deviates from the target orientation of the vehicle 200g, that is, the direction of the Z axis, toward a direction opposite to the initial orientation of the vehicle 200a (i.e., a deflection angle $\theta_1$ occurs). In short, an excessive turn of the vehicle results.

Therefore, in step S16, the added area Sa is computed, and the running distance of the second path is reduced by Sa/γmax1, so that a corrected path $P_3$ is determined (see FIG. 4D). That is, a process of removing the added area Sa from the area defined by the running distance-turning curvature graph regarding the second path of the path $P_2$ is executed. The area S3 regarding the corrected path $P_3$ is equal to the area δ regarding the basic path $P_0$. As a result, the deflection angle at the final position becomes 0, that is, becomes equal to the deflection angle that needs to be achieved at the target position. Thus, in the case where the running distance in the second path is changed, there is no need to change the content of steering control and therefore required calculation is simple, in comparison with the case where an area is removed from the first path or the third path. Furthermore, the controllability becomes more favorable, and high control accuracy can be maintained.

With regard to the corrected path P3, the deflection angle at the final position and the deflection angle at the target position are substantially equal, but the final position deviates in the direction of the X axis from the target position (see FIG. 7). Unlike the vehicle 200b that has followed the path $P_2$, the vehicle 200c that has followed the corrected path $P_3$ becomes parallel to the vehicle 200g being at the target position. However, the position of the vehicle 200c deviates to a side of the initial position 200a from the target position. This deviation increases as the distance from the point A to the point G increases. Therefore, the similarity transformation process and the initial steering angle changing process similar to the processes of steps S8 to S14 are performed on the path $P_3$ obtained by the deflection angle correction, so as to determine a path $P_4$ (step S 18).

Specifically, a process described below is executed. The distance from the initial position A to the final position on the path $P_3$ in the direction of X is expressed as Sub_Xf, and $\epsilon_1$=sXf/Sub_Xf is assumed. The steering angle δ at the position on the path $P_3$ that is a distance p from the point A is expressed as in δ=g(p). At this time, the steering angle δ' at the position of distance p from the point A on the similarity-transformed path $P_4$ is expressed as in δ'=1/$\epsilon_1$×g (p/$_1$), except for an early stage.

As indicated in FIG. 4E, the similarity-transformed path $P_4$ is a path obtained by elongating a distance of the path $P_3$ by $\epsilon_1$ times and compressing a curvature of the path $P_3$ by 1/$\epsilon_1$ time in the direction of curvature. Then, as in the case indicated in FIG. 4C, the initial curvature $\gamma_0$ is changed to a curvature regarding the path $P_4$, so that the area becomes larger by Sb than the area regarding the path $P_3$ or the basic path $P_0$. Since, compared with $\epsilon$, $\epsilon_1$ is considerably close to 1, the area Sb is smaller than the entire area S or the aforementioned area Sa. Therefore, the deviation in the deflection angle caused by the aforementioned positional correction falls within a tolerable range (see FIG. 8).

That is, the vehicle 200*d* that has followed the path $P_4$ coincides substantially with the vehicle 200*g* being at the target position. As a result, it is possible to perform the setting of a path with high accuracy even if the initial steering angle δ is not substantially 0, that is, if the setting of a path is performed during a state where the vehicle has been steered. In conjunction with the parking assist, it is often the case that the vehicle has been steered by the time when the initial position point A is reached. It is not easy to return the steering from the turned state to a neutral state without fail before execution of the parking assist. If returning to the neutral position is determined as a requirement for starting the parking assist, the operability of the assist degrades. In this embodiment, the setting of a path can be accomplished even during a state where the vehicle has been steered. Therefore, there is no need to return the steering to the neutral state before the assist, and therefore the operability of the assist improves.

The path $P_4$ is a target running locus set on the basis of the running distance-curvature relationship, and is not dependent on the speed or acceleration of the vehicle. Therefore, the driving assist control can be simplified.

In step S20, it is determined whether a target path has been set. In the case where it is determined that the vehicle cannot reach the target position G from the present position A even if the maximum turning curvature is maintained and therefore that a path cannot be set, the process proceeds to step S50. In step S50, it is indicated to the driver that the vehicle cannot reach the target position G from the present position A through the use of the monitor 34 or the speaker 33. After that, the process ends. In the case where the process proceeds to step S50, the driver can initiate the parking assist operation again after moving the vehicle 200 if necessary.

If a target path has been set, the process proceeds to step S22, in which an actual assist control is executed. At this time, it is preferable that when the shift lever is set at the reverse position, the parking assist ECU 1 instruct a drive force system (not shown) to execute an engine torque increase control. The torque increase control is a control of causing a change to a high driving force state (state of increased torque) by operating the engine at a revolution speed that is higher than a normal idling speed. This control expands the range of vehicle speed where a driver can adjust the vehicle speed by using only the brake pedal without operating the accelerator, so as to improve the operability of the vehicle. If the driver operates the brake pedal, the braking force applied to each wheel is adjusted in accordance with the degree of depression of the pedal, and therefore the vehicle speed is correspondingly adjusted. At this time, it is preferable to perform the guarding of the upper limit vehicle speed by controlling the braking force applied to each tire so that the vehicle speed detected by the tire wheel speed sensors 41 will not exceed the upper limit vehicle speed.

In the control of guiding the vehicle to the target position, the present position of the vehicle is first determined (step S22).

The determination of the present position can be accomplished on the basis of the movement of a characteristic point in the image acquired by the back camera 32. The present position can also be determined on the basis of the change in running distance based on output signals of the tire wheel speed sensor 41 and the acceleration sensor 42 and the change in steering angle based on an output signal of the steering angle sensor 23.

Then, the actual steering angle control is performed on the basis of the set locus of the running distance-curvature (steering angle) previously set on the basis the present position (running distance) (step S24). Specifically, the steering control portion 11, while monitoring the output signals of the steering angle sensor 23, controls the steering actuator 24 to drive the steering shaft 21 so that the steering angle of the steering tire wheel 25 will coincide with the set displacement in steering angle.

Since the vehicle is moved along a target path set as described above, the driver can concentrate on safety-checking surroundings on road and adjusting the vehicle speed. Furthermore, since each wheel receives a braking force corresponding to the amount of depression of the brake pedal accomplished by the driver, the driver can safely decelerate or stop the vehicle even if there exists an obstacle, a pedestrian, etc. on the road.

After the steering angle control, it is determined whether there is a deviation of the present position from the target path. If there is a large deviation, it is determined that the path needs correcting (step S26).

The deviation from the target path can be determined, for example, by accumulating the deviation of the present position from the target position or the deviation of the actual amount of steer from the target amount of steer with respect to the distance of run. If path correction is needed, the process proceeds to step S6, in which a path is re-set.

In the re-setting of a path, the vehicle has been steered, and the steering angle δ is often other than 0. According to the invention, the path setting can be accomplished with good accuracy even in a case where a path is set during steering. Therefore, the re-setting of a path can also be easily accomplished with good accuracy by the same logic as in the above-described steps.

Conversely, if there is only a small deviation from the target path, the process proceeds to step S28, in which it is determined whether the vehicle has reached the vicinity of the target parking position G. If the target parking position is not substantially reached, the process returns to step S22 so as to continue the assist control. Conversely, if it is determined that the target parking position has been reached, the process proceeds to step S30. In step S30, it is indicated to the driver via the monitor 34 and the speaker 33 that the target parking position has been reached. After that, the process ends.

Thus, as a target path is set through similarity transformation of a basic path, the set target path is provided with a good margin in steering characteristic. Furthermore, since the path is corrected in accordance with the deviation of the post-similarity transformation steering angle from the initial steering angle, it is possible to prevent the deflection angle of the vehicle from deviating from a target value, even if the initial steering angle is not neutral. Still furthermore, after correction of the deflection angle, the positional correction utilizing similarity transformation is executed, so that the vehicle can be reliably guided to a region close to the target position and the deviation in the deflection angle can be limited within a tolerable range.

What has been described above is a construction in which the steering angle is maintained with the initial curvature $\gamma_0$. However, this construction is not restrictive. For example, it is also possible to steer the vehicle from the initial curvature $\gamma_0$ to the curvature $\gamma$max while maintaining a constant rate of change in curvature with respect to distance (for example, a rate equal to the rate of change in curvature to distance within the initial region in FIG. 4B). This method, compared with the method of FIG. 4C, has a characteristic that the number of changes in the state of steering angle is small, and therefore the control is easy and a path can be more accurately set.

In the case of this method, the point of distance at which the curvature $\gamma$max is reached shifts to a shorter distance side of the point of distance $\epsilon$B at which the curvature $\gamma$max is reached in the case of FIG. 4C. As a result, the amount of increase Sa in the area of the running distance-turning curvature graph of the path becomes greater than in the case of FIG. 4C. Therefore, as in step S16, the added area Sa is determined, and then a corrected path $P_3$ in which the running distance of the second path is shorter by Sa/$\gamma$max1 is determined. In this case, too, a process is executed in which the area Sa added due to the direct transition from the initial curvature $\gamma_0$ to $\gamma$max is subtracted from the area on the second path of the path $P_2$. Therefore, the entire area on the corrected path $P_3$ becomes equal to the entire area on the basic path $P_0$. As a result, the deflection angle at the final position becomes 0, and therefor coincides with the deflection angle at the target position.

The description has been made with reference to an example in which the vehicle position correction is performed after the angle of deflection has been corrected. However, the positional deviation that occurs after correction of the deflection angle is small in comparison with the entire length of the path. In particular, if the initial steering angle is close to neutral, the positional deviation is often small so as to be within a tolerable range where positional correction is not needed. Therefore, it is possible to correct only the deflection angle without correcting the position.

Furthermore, the errors in the vehicle position and direction can be reduced by repeating the correction of deflection angle and the correction of position. However, the error reducing process may become a cause for increasing the amount of calculation, and therefore a sufficient number of times of executing the process is one.

What has been described above is an embodiment of the parking assist apparatus having an automatic steering function. However, the invention is also applicable to a parking assist apparatus that performs steering guidance in which an appropriate amount of steering is indicated to the driver, in addition to performing the automatic steering. The invention is applicable to not only the assist of backing parking but also the forward-run parking assist. Furthermore, the invention is applicable to not only the parking assist apparatus but also a driving assist apparatus that induces movement in accordance with the path, a lane keep system, etc.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A driving assist apparatus for a vehicle comprising:
    a setting portion that sets a basic path that changes a direction of the vehicle so as to coincide with a direction of the vehicle at a target position as changes in a turning curvature of the vehicle with respect to a running distance of the vehicle, based on a deflection angle that is an angle formed between the direction of the vehicle at the initial position and the direction of the vehicle at the target position, and an initial actual steering angle that is an actual steering angle of the vehicle at the initial position;
    a transforming portion that computes a path obtained by similarity-transforming the basic path based on a relationship between the initial position and the target position; and
    a correcting portion that corrects the similarity-transformed path into a target path along which the vehicle reaches the target position based on a difference between the initial actual steering angle and a steering angle occurring at an initial position on the similarity-transformed path.

2. The driving assist apparatus according to claim 1, wherein the basic path includes a first path in which the vehicle is driven by increasing a steering angle in one direction, a second path in which the vehicle is driven by maintaining the predetermined steering angle, and a third path in which the vehicle is driven by returning the steering angle to neutral, and the correcting portion corrects the direction of the vehicle at a final position on the similarity-transformed path to the direction of the vehicle at the target position by changing a running distance of the vehicle in the second path.

3. The driving assist apparatus according to claim 2 wherein the correcting portion further corrects the final position based on a ratio between a distance in a predetermined direction between the initial position and the final position and a distance in the predetermined direction between the initial position and the target position.

4. A diving assist method for a vehicle comprising the steps of:
    setting a basic path that changes a direction of the vehicle so as to coincide with a direction of the vehicle at a target position as changes in a turning curvature of the vehicle with respect to a running distance of the vehicle, based on a deflection angle that is an angle formed between the direction of the vehicle at the initial position and the direction of the vehicle at the target position, and an initial steering angle that is a steering angle of the vehicle at the initial position;
    computing a path obtained by similarity-transforming the basic path based on a relationship between the initial position and the target position; and
    correcting the similarity-transformed path based on a difference between the initial actual steering angle and a steering angle occurring at an initial position on the similarity-transformed path.

5. The driving assist method according to claim 4, wherein the basic path includes a first path in which the vehicle is driven by increasing a steering angle in one direction, a second path in which the vehicle is driven by maintaining the predetermined steering angle, and a third path in which the vehicle is driven by decreasing the steering angle to neutral, and further comprising the step of correcting the direction of the vehicle at a final position by changing a running distance of the vehicle in the second path.

6. The driving assist method according to claim 5 further comprising the step of correcting the final position based on a ratio between a distance in a predetermined direction between the initial position and the final position and a distance in the predetermined direction between the initial position and the target position.

7. A driving assist apparatus for a vehicle comprising:

setting means for setting a basic path that changes a direction of the vehicle at so as to coincide with a direction of the vehicle at a target position as changes in a turning curvature of the vehicle with respect to a running distance of the vehicle, based on a deflection angle that is an angle formed between the direction of the vehicle at the initial position and the direction of the vehicle at the target position, and an initial actual steering angle that is an actual steering angle of the vehicle at the initial position;

transforming means for computing a path obtained by similarity-transforming the basic path based on a relationship between the initial position and the target position; and correcting means for correcting the similarity-transformed path into a target path along which the vehicle reaches the target position based on a difference between the initial actual steering angle and a steering angle occurring at an initial position on the similarity-transformed path.

* * * * *